United States Patent Office 3,134,787
Patented May 26, 1964

3,134,787
4,7-DIHYDRO-2-(HYDROXY, OR METHOXY PHENYL)-1,3-DIOXEPINS
George B. Sterling, Midland, and Chester E. Pawloski, Bay City, Mich., assignors to The Dow Chemical Company, Midland, Mich., a corporation of Delaware
No Drawing. Filed Mar. 5, 1962, Ser. No. 177,167
3 Claims. (Cl. 260—338)

The present invention is directed to dioxepins corresponding to the formula:

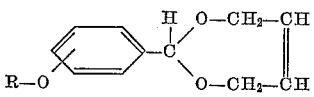

In this and succeeding formulae, R represents hydrogen or methyl. These compounds are liquid materials which are somewhat soluble in many common organic solvents and of low solubility in water. They are useful as parasiticides for the control of a number of insects, worms, bacterial or fungal organisms and protozoan organisms. They are also useful in the manufacture of improved latex polymers and vinyl rubber products such as copolymers with butadiene. The latexes and vinyl rubber products are found to have very desirable and improved tensile, soft, lubricous and elastic properties.

The novel dioxepin compounds are prepared by reaction 2-butene-1,4-diol with a suitable dialkoxyalkane and a hydroxybenzaldehyde or methoxybenzaldehyde. Suitable dialkoxyalkanes include 2,2-dimethoxybutane, 2,2-dibutoxypropane, 3,3 - dimethoxypentane, 2-butoxy-2-methoxypropane, 1,1 - diethoxyethane, dimethoxycyclohexane, α,α-dimethoxytoluene and the like. The reaction is carried out in the presence of a small and catalytic amount of an acidic catalyst such as sulfuric acid, dichloroacetic acid, dichloropropionic acid, phosphoric acid, trichloroacetic acid and the like. Good results are obtained when employing substantially equimolecular proportions of the butenediol, aldehyde and dialkoxyalkane materials. Where optimum yields are desired, it is preferred to employ an excess of the aldehyde and dialkoxyalkane reagents. The reaction conveniently is carried out in an organic liquid as reaction medium and takes place readily at temperatures of from 10° to 100° C. In carrying out the reaction, the butenediol, aldehyde and dialkoxyalkane reagents are mixed together with a catalytic amount of the acid catalyst and the resulting mixture maintained for a short period in the reaction temperature range. Upon completion of the reaction, the reaction mixture is fractionally distilled under reduced pressure to obtain the desired product as a liquid residue.

The following examples merely illustrate the invention and are not to be construed as limiting.

*Example 1.—2-(o-Hydroxyphenyl)-4,7-Dihydro-1,3-Dioxepin*

2-butene-1,4-diol (264 grams; 3 moles), 312 grams (3 moles) of 2,2-dimethoxypropane and 366 grams (3 moles) of 2-hydroxybenzaldehyde were mixed together with stirring in 200 milliliters of benzene containing a few drops of concentrated sulfuric acid. During the stirring operation, which was carried out at room temperature, a reaction took place resulting in the formation of a single liquid phase. The reaction mixture was thereafter distilled in a 3:1 reflux ratio until the pot temperature reached 120° C. after which it was allowed to cool. A small amount of sodium carbonate was then added to the mixture and the distillation completed under vacuum to obtain a 2-(o-hydroxyphenyl)-4,7-dihydro-1,3-dioxepin product as a liquid residue. This product boiled at 121° C. at 0.2 millimeter pressure and had carbon and hydrogen contents of 68.8 and 6.36 percent, respectively, as compared to theoretical contents of 68.8 and 6.3 percent.

*Example 2.—2-(p-Methoxyphenyl)-4,7-Dihydro-1,3-Dioxepin*

2-butene-1,4-diol (2 moles), 2 moles of p-methoxybenzaldehyde, 2 moles of 2,2-dimethoxypropane, 100 milliliters of benzene and a few drops of concentrated sulfuric acid were mixed together with stirring at room temperature. During the stirring, a reaction took place with the formation of a single phase. The reaction mixture was then distilled at a 3:1 reflux ratio until the pot temperature was 120° C. after which it was allowed to cool. A small amount of sodium carbonate was then added to the mixture and the distillation continued under reduced pressure to obtain a 2-(p-methoxyphenyl)-4,7-dihydro-1,3-dioxepin product as a liquid material. This product boiled at 136° C. at 1.9 millimeters pressure and had a refractive index n/D of 1.5463 at 25° C.

In exactly comparable operations, p-hydroxy-benzaldehyde, m-hydroxybenzaldehyde and 2-methoxybenzaldehyde are each separately reacted with 2-butene-1,4-diol and 2,2-dimethoxypropane together with a catalytic amount of sulfuric acid to obtain the corresponding 2-(p-hydroxyphenyl)-4,7-dihydro-1,3-dioxepin, 2-(m-hydroxyphenyl)-4,7-dihydro-1,3-dioxepin and 2-(o-methoxyphenyl)-4,7-dihydro-1,3-dioxepin products as liquid materials.

The new compounds of the present invention have been found to be useful as parasiticides and as constituents of latex polymers and vinyl rubber products. For parasiticidal use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsions or water dispersions with or without the addition of wetting, dispersing and emulsifying agents. In representative operations, substantially complete controls of *Eimeria necatrix* are obtained with compositions containing 0.1 percent by weight of the 2-(o-hydroxyphenyl)-4,7-dihydro-1,3-dioxepin compound.

What is claimed is:
1. A compound having the formula:

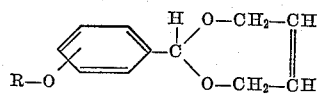

wherein R represents a member of the group consisting of hydrogen and methyl.
2. 2-(o-hydroxyphenyl)-4,7-dihydro-1,3-dioxepin.
3. 2-(p-methoxyphenyl)-4,7-dihydro-1,3-dioxepin.

No references cited.